US010547472B2

(12) United States Patent
Koenigsmark et al.

(10) Patent No.: US 10,547,472 B2
(45) Date of Patent: Jan. 28, 2020

(54) RADIO FREQUENCY (RF) COAX INTERFACE FOR FULL DATA RATE CONTROLLER AREA NETWORK (CAN) PROTOCOL SIGNALING WITH LOW LATENCY

(71) Applicant: THALES DEFENSE & SECURITY, INC., Clarksburg, MD (US)

(72) Inventors: Brian Koenigsmark, Marriottsville, MD (US); Robert Peterson, Derwood, MD (US)

(73) Assignee: THALES DEFENSE & SECURITY, INC., Clarksburg, MD (US)

( * ) Notice: Subject to any disclaimer, the term of this patent is extended or adjusted under 35 U.S.C. 154(b) by 0 days.

(21) Appl. No.: 15/488,167

(22) Filed: Apr. 14, 2017

(65) Prior Publication Data

US 2017/0302471 A1   Oct. 19, 2017

Related U.S. Application Data

(60) Provisional application No. 62/323,322, filed on Apr. 15, 2016.

(51) Int. Cl.
*H04L 5/08* (2006.01)
*H04L 12/40* (2006.01)
*H04L 29/06* (2006.01)

(52) U.S. Cl.
CPC ........ *H04L 12/40169* (2013.01); *H04L 69/08* (2013.01); *H04L 2012/40215* (2013.01)

(58) Field of Classification Search
CPC ... H04L 12/40169; H04L 5/143; H04L 27/04; H04L 69/08; H04L 2012/40215

USPC ......................................................... 370/297
See application file for complete search history.

(56) References Cited

U.S. PATENT DOCUMENTS

| | | | | |
|---|---|---|---|---|
| 8,089,266 | B2 * | 1/2012 | Rostamzadeh | G01R 31/001 324/127 |
| 2008/0053129 | A1 * | 3/2008 | Follette | B60H 1/00371 62/244 |
| 2009/0285151 | A1 * | 11/2009 | Eidenschink | H04B 7/18582 370/316 |
| 2012/0233765 | A1 * | 9/2012 | Altman | A61H 33/005 4/524 |
| 2013/0062966 | A1 * | 3/2013 | Verghese | H02J 7/025 307/104 |
| 2014/0218187 | A1 * | 8/2014 | Chun | G08B 21/06 340/439 |
| 2014/0306815 | A1 * | 10/2014 | Henriet | B60C 23/0455 340/447 |

(Continued)

*Primary Examiner* — Sai Ming Chan
(74) *Attorney, Agent, or Firm* — Arent Fox LLP

(57) ABSTRACT

A method for implementing controller area network (CAN) communications between a plurality of CAN nodes using a single radio frequency (RF) coax cable is provided. In an aspect, a hardware interface (e.g., an electronic circuit) may be coupled to each of the plurality of CAN nodes. The hardware interface may receive a CAN signal from a first CAN node. The hardware interface may convert the CAN signal to a single RF signal and transmit the RF signal to a second CAN node over the single RF coax cable. Moreover, the hardware interface may transmit a CAN feedback signal received over the RF coax cable to the first CAN node. In an aspect, the hardware interface may include an amplitude modulation (AM) modulator, an AM detector, and a bandpass filter.

20 Claims, 7 Drawing Sheets

(56) References Cited

U.S. PATENT DOCUMENTS

2017/0201322 A1* 7/2017 Harel .................. H04W 88/085

* cited by examiner

RADIO FREQUENCY (RF) COAX INTERFACE FOR FULL DATA RATE CONTROLLER AREA NETWORK (CAN) PROTOCOL SIGNALING WITH LOW LATENCY

CROSS-REFERENCE TO RELATED APPLICATION(S)

This application claims the benefit of U.S. Provisional Application Ser. No. 62/323,322, entitled "Radio Frequency (RF) Coax Interface for Full Data Rate Controller Area Network (CAN) Protocol Signaling with Low Latency" and filed on Apr. 15, 2016, which is expressly incorporated by reference herein in its entirety.

TECHNICAL FIELD

The present disclosure relates generally to controller area network (CAN) bus devices, and more specifically, to CAN bus devices having a single radio frequency (RF) coax interface for CAN protocol signaling.

BACKGROUND

A Controller Area Network (CAN) bus is an International Standardization Organization (ISO) serial communications bus protocol originally developed for the automotive industry to replace complex wiring harness with a two-wire bus. The specification calls for high immunity to electrical interference and the ability to self-diagnose and repair data errors. These features have led to CAN's popularity in a variety of markets including maritime, aeronautical, and terrestrial markets. In conventional CAN bus control systems, CAN signals are exchanged between a terminal and a transceiver using differential signaling over, for example, a twisted-pair cable. These CAN signals may be combined with several other control cables to be transmitted over numerous, commonly five, separate control cables. This configuration requires multiple cable runs, thereby creating latency, added cost, and installation complexity.

Therefore, there exists an unmet need in the art for an interface (e.g., an electronic circuit) to integrate the CAN bus communications protocol onto a single radio frequency (RF) coax cable to enable fully compliant CAN protocol signaling with low latency and superior form factor.

SUMMARY

In accordance with an aspect, the present disclosure may provide an electronic circuit for integrating CAN communications onto a RF coax cable. The electronic circuit may include an input port configured to receive a first CAN signal, a conversion circuit configured to convert the first CAN signal to a RF signal, and a first output port configured to transmit the RF signal.

In accordance with another aspect, the present disclosure may provide a method for implementing CAN communications between a plurality of CAN nodes using a RF coax cable. The method may include receiving a first CAN signal from a first CAN node. The method may further include converting the first CAN signal to a RF signal. In addition, the method may include transmitting the RF signal to a second CAN node over the RF coax cable.

In accordance with yet another aspect, the present disclosure may provide a computer-readable medium (e.g., a non-transitory medium) storing computer executable code for CAN communications. The computer-readable medium may include code for transmitting, at a first CAN node, a CAN signal to a second CAN node through a hardware interface, where the hardware interface is configured to convert the CAN signal to a RF signal for transmission over a RF coax cable to the second CAN node.

Additional advantages and novel features of these aspects will be set forth in part in the description that follows, and in part will become more apparent to those skilled in the art upon examination of the following or upon learning by practice of the disclosure.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
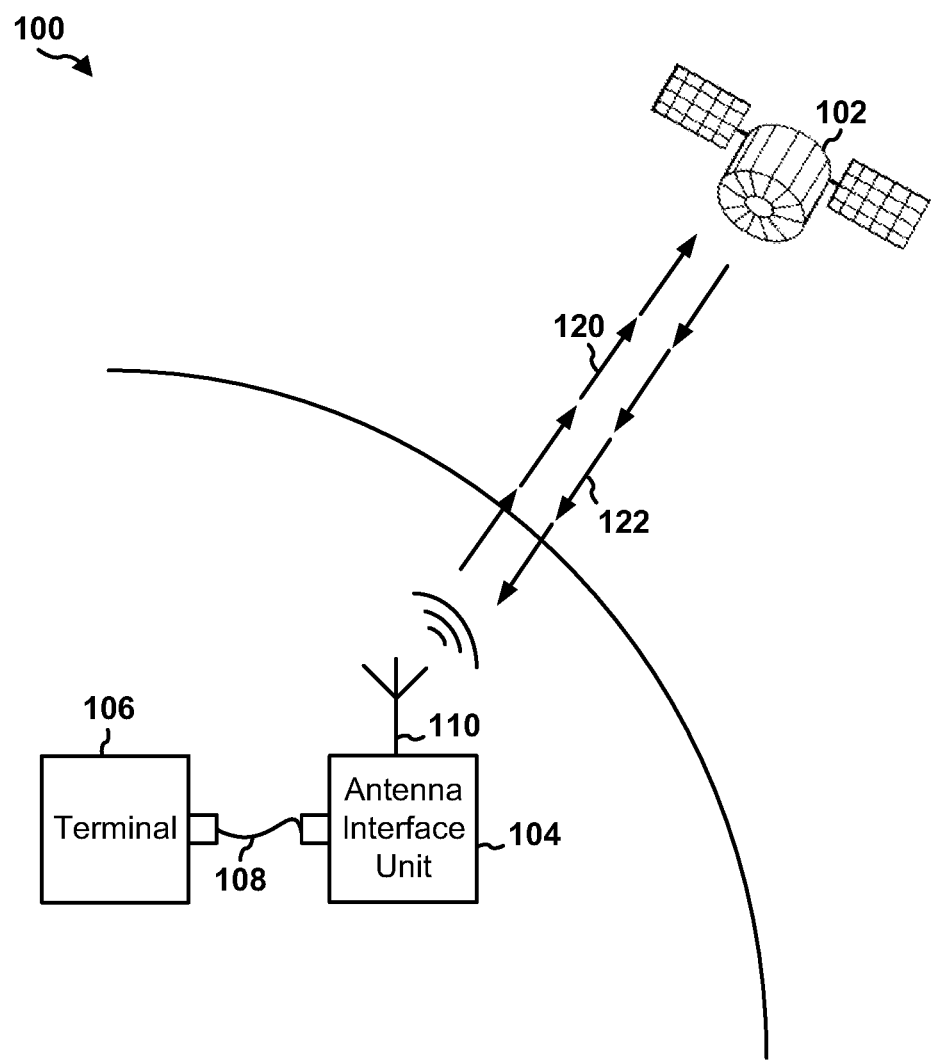
FIG. 1 is a diagram illustrating one example of a communications system in accordance with various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of a CAN/RF conversion circuit for integrating the CAN-bus communications protocol onto a single RF coax cable will now be presented with reference to various methods, apparatuses, and media. These methods, apparatuses, and media will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall implementation.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, discrete RF circuits, and other suitable hardware configured to perform the various functionality described throughout this disclosure. One or more processors in the processing system may execute software. Software shall be construed broadly to include instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium or media. Computer-readable media includes computer storage media. Storage media may be any available media that is able to be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that may be used to carry or store desired program code in the form of instructions or data structures and that may be accessed by a computer. Disk and disc, as used herein, include CD, laser disc, optical disc, digital versatile disc (DVD), and floppy disk, where disks usually reproduce data magnetically, while discs reproduce data optically with lasers. Combinations of the above should also be included within the scope of computer-readable media.

Aspects of a CAN/RF conversion circuit presented herein may be compatible with transmitting and/or receiving CAN-bus signals between a terminal and an antenna over a single RF cable. In an aspect, the terminal may be a mobile user terminal such as, but not limited to, an earth terminal, a mobile satellite broadband terminal, or a land mobile terminal (LMT). Further, in an aspect, the terminal may be mounted to, for example, a vehicle, a maritime vessel, or an aircraft. In an aspect, the antenna may be a directional or beam antenna. For example, the antenna may be a phased array antenna configured to track a satellite such as, but not limited to, a low-earth orbit (LEO) satellite, a medium earth orbit (MEO) satellite, or a geostationary earth orbit (GEO) satellite. It should be understood that the CAN/RF conversion circuit of the present disclosure may be used with any of the terminals and antennas listed above without departing from the scope of the present disclosure.

FIG. 1 illustrates an overall system diagram of an example communications system 100 for use in accordance with aspects of the present disclosure. The communications system 100 of FIG. 1 may include, for example, a terminal 106, a single RF coax cable 108, an antenna interface unit 104, an antenna 110, and a satellite 102.

In an aspect, the terminal 106 may be communicatively coupled to the antenna interface unit 104 via, for example, the single RF coax cable 108. In an aspect, the antenna interface unit 104 may be configured to electrically steer an antenna 110 towards a communications satellite (e.g., satellite 102) in an orbital range of the terminal 106. For example, in an aspect, the terminal 106 may include a satellite modem (e.g., satellite modem 220 in FIG. 2) for generating beam steering information and sending a control signal (e.g., a CAN-bus signal) including the beam steering information and other control information such as, but not limited to, health, status, and/or timing information, to the antenna interface unit 104 over the single RF coax cable 108. The antenna 110 may acquire and continuously track the satellite 102 based on the control signal received from terminal 106. In an aspect, an uplink satellite communications link 120 and/or a downlink satellite communications link 122 may be established and maintained between the terminal 106 and the satellite 102 based on the control signal. Moreover, in an aspect, the terminal 106 may transmit and/or receive data, timing reference, and/or power RF signals to antenna interface unit 104 over the single RF coax cable 108.

It is to be appreciated that the single RF coax cable 108 may include a length such as, but not limited to, 100 feet. For example, in some aspects, the single RF coax cable 108 may have either a longer or shorter length than 100 feet. It is to be appreciated that, according to aspects of the present disclosure, an RF signal may be transmitted over the RF coax cable 108 up to a speed of one megabit per second (1 Mbps).

Moreover, it is to be appreciated that the example communications system of FIG. 1 is intended for illustrative purposes and is not intended to limit the scope of the present disclosure. For example, the present disclosure may also be extended to other communications systems such as, but not limited to, an in-vehicle network.

Figure 2:
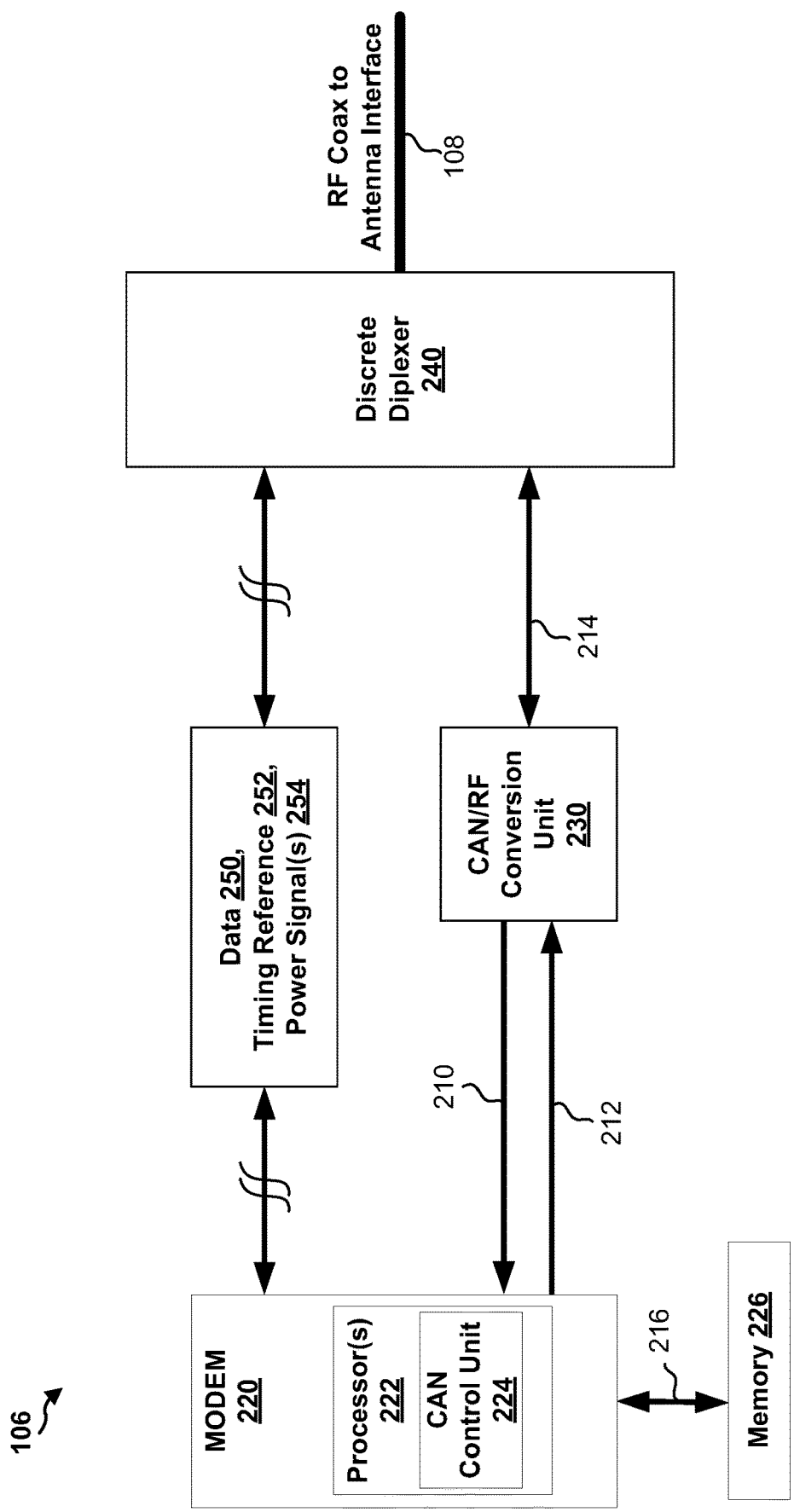
FIG. 2 is a diagram illustrating example aspects of a terminal in accordance with various aspects of the present disclosure.

FIG. 2 illustrates a diagram including an example of a terminal 106 (e.g., the terminal 106 in FIG. 1). According to the present aspects, the terminal 106 may include one or more modems 220, a CAN/RF conversion unit 230, and a discrete diplexer 240. The CAN/RF conversion unit 230 may be a hardware interface (e.g., an electronic circuit) communicatively coupled to the modem 220 and the discrete diplexer 240.

In an aspect, the modem 220 may be, for example, a satellite modem, which may process digital data and facilitate communications with a satellite 102 (FIG. 1). For example, in an aspect, the modem 220 may be used to transmit and/or receive RF signals including one or more of a data signal 250 or a timing reference signal 252 to satellite 102 (FIG. 1). The data signal 250 may be transmitted and/or received over a main communication channel of satellite 102 (e.g., a 1616-1626.5 MHz band). The timing reference signal 252 may be transmitted and/or received over a secondary communication channel of satellite 102 (e.g., a band of frequencies produced by a sum of frequencies 14.4 MHz and 19.2 MHz). It is to be appreciated that the modem 220 may also be a modem compatible with other wired and/or wireless communications networks and that the modem 220 may be used to transmit and/or receive other types of RF signals between devices using different frequency channels as well.

Moreover, in aspect, the modem 220 may operate in combination with a CAN control unit 224 for enabling transmission and/or reception of CAN-bus signals. The CAN control unit 224 may include hardware, firmware, and/or software code executable by a processor 222 (e.g., a microprocessor) for transmitting and/or receiving CAN-bus signals 210, 212, the code comprising instructions and being stored in a memory 226 (e.g., non-transitory computer-readable medium). The CAN control unit 224 may be coupled to the memory 226 via a bus 216.

In an aspect, the CAN/RF conversion unit 230 (see, e.g., details in FIG. 4) may comprise circuitry for converting a CAN-bus signal to a single RF signal. For example, in an aspect, the CAN/RF conversion unit 230 may convert a CAN-bus signal 212 received from modem 220 to an RF signal 214. The CAN/RF conversion unit 230 may transmit the RF signal 214 to the discrete diplexer 240. Moreover, in an aspect, the CAN/RF conversion unit 230 may convert an RF signal 214 to a CAN-bus signal 210. For example, in an aspect, the CAN/RF conversion unit 230 may convert an RF signal 214 received from the discrete diplexer 240 to a CAN-bus signal 210.

In an aspect, the discrete diplexer 240 may comprise suitable circuitry, logic, and/or code for merging one or more signals of different frequency into a single RF signal. For example, in an aspect, the discrete diplexer 240 may merge one or more of the data signal 250, the timing reference signal 252, or a power signal 254 received from modem 220 with an RF signal 214 received from CAN/RF conversion unit 230 to generate a single RF signal for transmission over a single RF coax cable 108 (FIG. 1). In another aspect, the discrete diplexer 240 may extract one or more signals of different frequencies from a single RF signal. For example, in an aspect, the discrete diplexer 240 may extract an RF signal 214 and one or more of a data signal 250, timing reference signal 252, or power signal 254 from a single RF signal received over the single RF coax cable 108.

Figure 3:
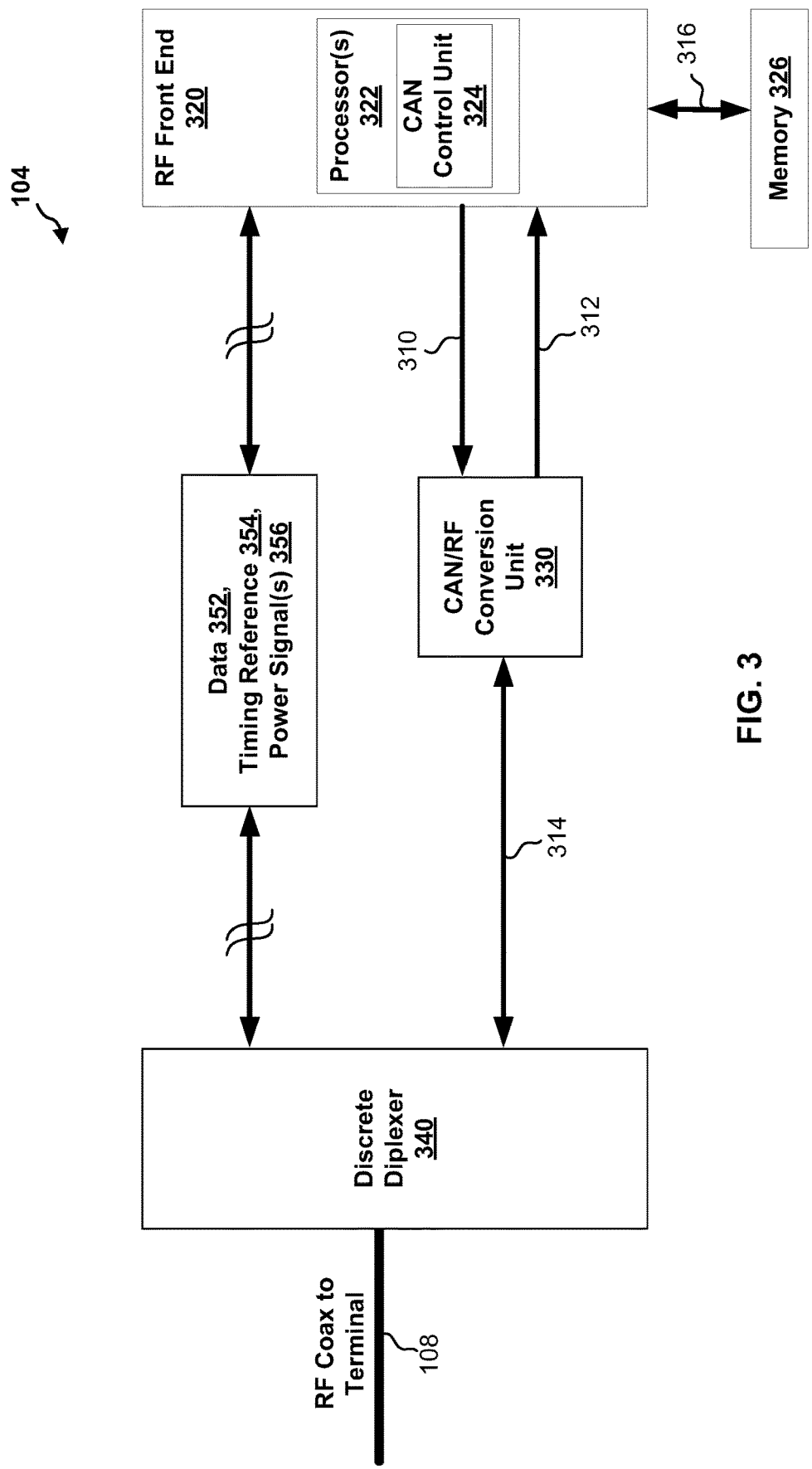
FIG. 3 is a diagram illustrating example aspects of an antenna interface unit in accordance with aspects of the present disclosure.

FIG. 3 illustrates a diagram including an example of an antenna interface unit 104 (e.g., the antenna interface unit 104 in FIG. 1). According to the present aspects, the antenna interface unit 104 may include an RF front end 320, a CAN/RF conversion unit 330, and a discrete diplexer 340. The CAN/RF conversion unit 330 may be an electronic circuit communicatively coupled to the RF front end 320 and the discrete diplexer 340.

In an aspect, the RF front end 320 may be connected to one or more antennas 110 (FIG. 1) for receiving and/or transmitting communications, for example, over uplink satellite communications link 120 (FIG. 1) and/or a downlink satellite communications link 122 (FIG. 1). In an aspect, antenna 110 (FIG. 1) may be a phased array antenna including a plurality of antenna elements. For example, in an aspect, the RF front end 320 may comprise a power divider and a corresponding phase shifter and/or amplifier for each antenna element of the plurality of antenna elements (not shown).

Moreover, in aspect, the RF front end 320 may comprise a CAN control unit 324 for enabling transmission and/or reception of CAN-bus signals. The CAN control unit 324 may include hardware, firmware, and/or software code executable by a processor 322 (e.g., a microprocessor) for transmitting and/or receiving CAN-bus signals 310, 312, the code comprising instructions and being stored in a memory 326 (e.g., non-transitory computer-readable medium). The CAN control unit 324 may be coupled to the memory 326 via a bus 316.

In an aspect, the CAN/RF conversion unit 330 (see, e.g., details in FIG. 4) may comprise circuitry for converting a CAN-bus signal 310 to an RF signal 314. For example, in an aspect, the CAN/RF conversion unit 330 may convert a CAN-bus signal 310 received from RF front end 320 to an RF signal 314. Moreover, in an aspect, the CAN/RF conversion circuit 330 may convert an RF signal 314 to a CAN-bus signal 312. For example, in an aspect, the CAN/RF conversion unit 330 may convert an RF signal 314 received from discrete diplexer 340 to a CAN-bus signal 312. The CAN-bus signal 312 may include control information such as, but not limited to, beam-steering information for setting a phase of each of the phase shifters of RF front end 320.

In an aspect, the discrete diplexer 340 may comprise suitable circuitry, logic, and/or code for extracting one or more signals of different frequencies from a single RF signal. For example, in an aspect, the discrete diplexer 340 may extract one or more of a data signal 352, timing reference signal 354, or power signal 356 and a RF signal 314 from a single RF signal received over the single RF coax cable 108. In another aspect, the discrete diplexer 340 may merge one or more signals of different frequency into a single RF signal. For example, in an aspect, the discrete diplexer 340 may merge a data signal 352 or timing reference signal 354 received from RF front end 320 with an RF signal 314 received from CAN/RF conversion unit 330 to generate a single RF signal for transmission over the single RF coax cable 108.

Figure 4:
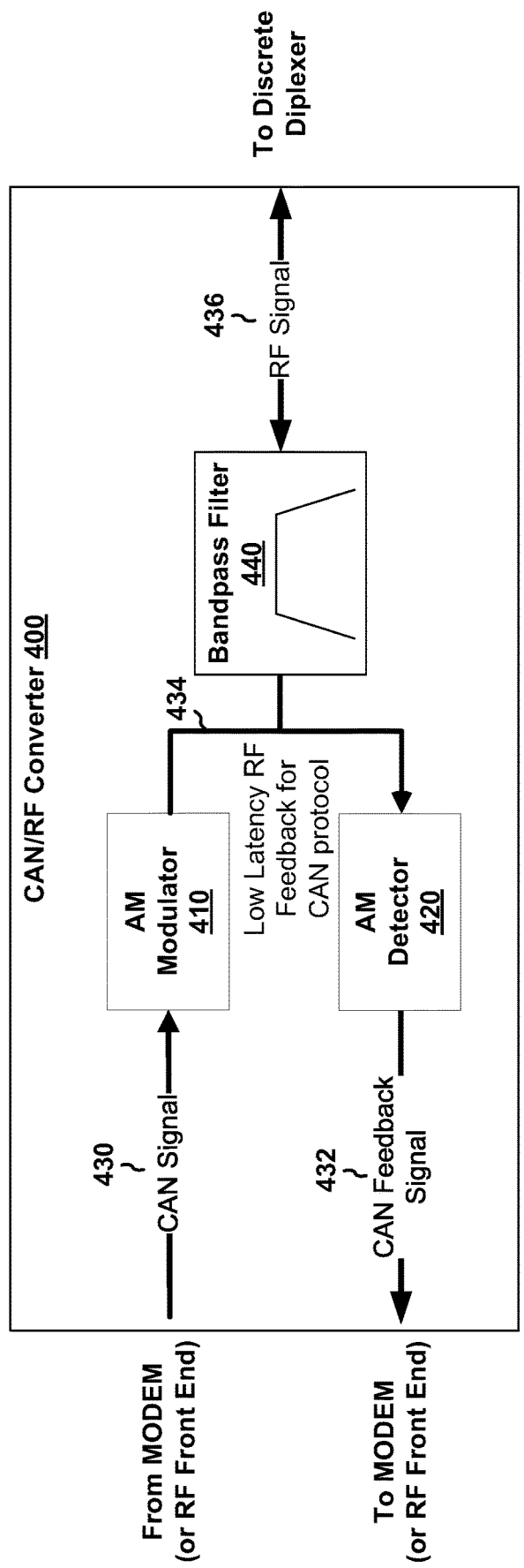
FIG. 4 is a diagram illustrating example aspects of a conversion circuit in accordance with aspects of the present disclosure.

FIG. 4 illustrates a diagram including an example of a CAN/RF conversion unit 400. In an aspect, the CAN/RF conversion unit 400 may comprise an amplitude modulation (AM) modulator 410, a bandpass filter 440, and an AM detector 420, each coupled to one another.

In an aspect, the CAN/RF conversion unit 400 may correspond to the CAN/RF conversion unit 230 of terminal 106 in FIG. 2. In this aspect, the CAN/RF converter 400 may receive a CAN-bus signal 430 from the modem 220 (FIG. 2), transmit a CAN-bus feedback signal 432 to the modem 220 (FIG. 2), and transmit an RF signal 436 to the discrete diplexer 240 (FIG. 2). Here, the CAN-bus signal 430 may correspond to CAN-bus signal 212 of FIG. 2, the CAN-bus feedback signal 432 may correspond to CAN-bus signal 210 of FIG. 2, and the RF modulated signal 436 may correspond to RF signal 214 of FIG. 2.

In an aspect, the AM modulator 410 may comprise suitable circuitry (e.g., one or more transistors) for converting a CAN-bus signal 430 to an RF signal 434. For example, in an aspect, the AM modulator 410 may modulate a CAN-bus signal 430 received from modem 220 (FIG. 2) to a radio frequency such as, but not limited to, 316 megahertz (MHz) to generate an RF signal 434.

In an aspect, the bandpass filter 440 may comprise suitable circuitry for filtering an RF signal 434. For example, in an aspect, the bandpass filter 440 may be a surface acoustic wave (SAW) filter with a center frequency such as, but not limited to, 316 MHz. In an aspect, the bandpass filter 440 may filter an RF modulated signal 434 received from AM modulator 410 to generate a filtered RF signal 436. The filtered RF signal 436 may then be transmitted over a single RF coax cable 108 (FIG. 2). For example, in an aspect, the filtered RF signal 436 may be transmitted to a discrete diplexer 240, where the filtered RF signal 436 may be combined with other RF signals (e.g., data signal(s) 250, timing reference signal(s) 252, and/or power signal(s) 254) to generate a single RF signal. The discrete diplexer 240 may then transmit the single RF signal over the single RF coax cable 108 (FIG. 1) to an antenna interface unit 104 (FIG. 1).

In an aspect, the AM detector 420 may comprise suitable circuitry for detecting a presence of an RF modulated signal 434 and converting the RF modulated signal 434 to a CAN-bus signal 432. For example, in an aspect, the AM detector 420 may detect a presence of an RF modulated signal 434 that includes a CAN-bus feedback signal.

It is to be appreciated that a CAN-bus controller, for example, CAN control unit 224 of the modem 220 (FIG. 2), may, in accordance with the CAN-bus protocol, allocate a priority to each CAN-bus signal 430 transmitted over a CAN-bus and continuously monitor the transmission of each bit of the CAN-bus signal 430 over the CAN-bus. For example, the CAN control unit 224 (FIG. 2) may set an identifier field of a CAN-bus signal 430 to a specific priority number prior to transmission. The lower the value of the priority number, the higher the priority of the CAN-bus signal. The CAN control unit 224 (FIG. 2) may then repeatedly transmit a CAN-bus signal 430 over the CAN-bus until the CAN control unit 224 determines that another CAN-bus controller, for example, CAN control unit 324 of the RF front end 320 (FIG. 3), wants to transmit a CAN-bus signal with a higher priority. For example, if another CAN-bus controller with a higher priority begins to transmit on the CAN-bus simultaneously, then the CAN-bus controller with the higher priority may overwrite the identifier field of the CAN-bus signal 430. Otherwise, the identifier field of the CAN-bus signal 430 may not be overwritten by another modem.

In an aspect, the AM detector 420 may detect the presence of an RF modulated signal 434 that includes a CAN-bus signal with a modified or a non-modified identifier field. The AM detector 420 may then convert the RF modulated signal 434 to a CAN-bus signal 432 and transmit the CAN-bus signal 432 to modem 220 (FIG. 2). It is to be appreciated that, according to the present aspects, the CAN-bus signal 432 may be transmitted to the modem 220 (FIG. 2) within 200 ns of the modem 220 transmitting the CAN-bus signal 430.

In another aspect, the CAN/RF converter 400 may correspond to the CAN/RF conversion unit 330 of antenna interface unit 104 (FIG. 3). In this aspect, the CAN/RF converter 400 may receive a CAN-bus signal 430 from an RF front end 320 of antenna interface unit 104 (FIG. 3), transmit an CAN-bus feedback signal 432 to the RF front end 320 (FIG. 3), and transmit an RF signal 434 to the discrete diplexer 340 (FIG. 3). Here, the CAN-bus signal 430 may correspond to CAN-bus signal 310 of FIG. 3, the CAN-bus feedback signal 432 may correspond to CAN-bus signal 312, and the RF signal 436 may correspond to RF signal 314 of FIG. 3.

As described above, the CAN/RF converter 400 may include an AM modulator 410 for modulating the received CAN-bus signal 430 to an RF signal 434, a bandpass filter 440 for filtering the RF modulated signal 434 to produce a filtered RF signal 436 for transmission over a single RF coax cable 108 (FIG. 3), and an AM detector 420 for converting a detected RF modulated signal 434 to a CAN-bus signal 432 for transmission to an RF front end 320.

In yet another example, aspects presented herein may be implemented using software or a combination of both hardware and software.

Figure 5:
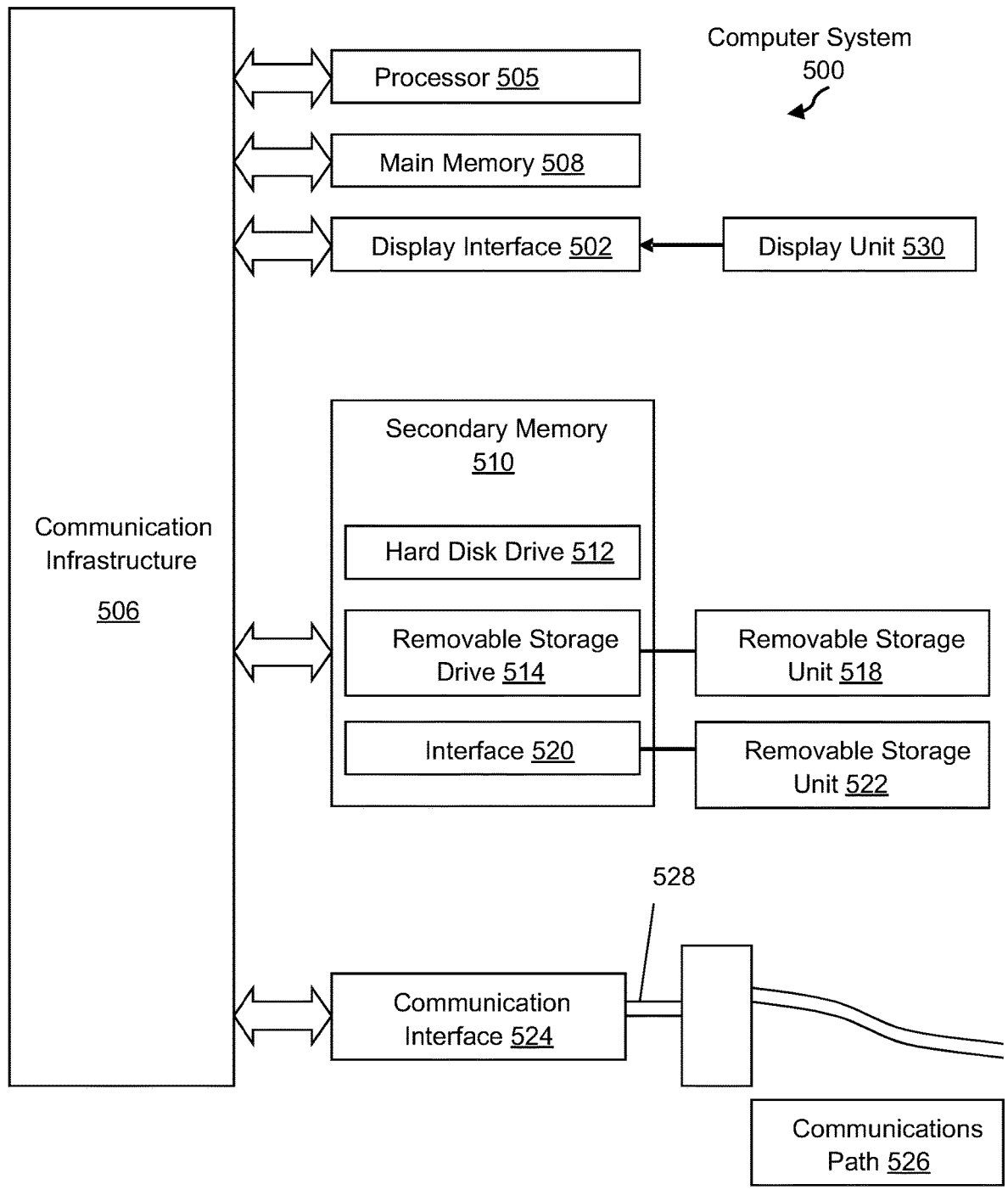
FIG. 5 is a system diagram illustrating various example hardware components and other features, for use in accordance with aspects of the present disclosure.

FIG. 5 is an example system diagram of various hardware components and other features, for use in accordance with aspects presented herein. The aspects may be implemented using hardware, software, or a combination thereof and may be implemented in one or more computer systems or other processing systems. In one example, the aspects may include one or more computer systems capable of carrying out the functionality described herein, e.g., in connection with FIG. 2, FIG. 3, and FIG. 4. An example of such a computer system (e.g., terminal 106 and/or satellite 102) is shown in FIG. 1.

In FIG. 5, computer system 500 includes one or more processors, such as processor 504. For example, the processor 505 may be configured for signal processing at a ground terminal (e.g., terminal 106 of FIG. 1) and/or a satellite (e.g., satellite 102 in FIG. 1). The processor 505 may be connected to a communication infrastructure 506 (e.g., a communications bus, cross-over bar, or network). The communication infrastructure 506 may correspond to bus 216 (FIG. 2). Various software aspects are described in terms of this example computer system. After reading this description, it will become apparent to a person skilled in the relevant art(s) how to implement the aspects presented herein using other computer systems and/or architectures.

Computer system 500 may include a display interface 502 that forwards graphics, text, and other data from the communication infrastructure 506 (or from a frame buffer not shown) for display on a display unit 530. In an aspect, the display unit 530 may be located in the ground terminal 106 illustrated in FIG. 1 and configured to display data and/or control information obtained from the satellite 102 illustrated in FIG. 1. Computer system 500 may also include a main memory 508, e.g., RAM, and may also include a secondary memory 510. The main memory 508 may correspond to, for example, memory 226 (FIG. 2). The secondary memory 510 may include, for example, a hard disk drive 512 and/or a removable storage drive 514, representing a floppy disk drive, a magnetic tape drive, an optical disk drive, etc. The removable storage drive 514 may read from and/or write to a removable storage unit 518 in a well-known manner. Removable storage unit 518, represents a floppy disk, magnetic tape, optical disk, etc., which may be read by and written to removable storage drive 514. As will be appreciated, the removable storage unit 518 may include a computer usable storage medium having stored therein computer software and/or data.

In alternative aspects, secondary memory 510 may include other similar devices for allowing computer programs or other instructions to be loaded into computer system 500. Such devices may include, for example, a removable storage unit 522 and an interface 520. Examples of such may include a program cartridge and cartridge interface (such as that found in video game devices), a removable memory chip (such as an erasable programmable read only memory (EPROM), or programmable read only memory (PROM)) and associated socket, and other removable storage units 522 and interfaces 520, which allow software and data to be transferred from the removable storage unit 522 to computer system 500.

Computer system 500 may also include a communications interface 524. Communications interface 524 may allow software and data to be transferred between computer system 500 and external devices. Examples of communications interface 524 may include a modem, network interface (such as an Ethernet card), a communications port, a Personal Computer Memory Card International Association (PCMCIA) slot and card, etc. For example, the communications interface 524 may correspond to modem 220 (FIG. 2). Software and data transferred via communications interface 524 may be in the form of signals 528, which may be electronic, electromagnetic, optical or other signals capable of being received by communications interface 524. These signals 528 may be provided to communications interface 524 via one or more communications paths (e.g., channel) 526. The path 526 may carry signals 528 and may be implemented using wire or cable, fiber optics, a telephone line, a cellular link, wireless communications link, a RF link and/or other communications channels. In the present disclosure, the terms "computer program medium" and "computer usable medium" may be used to refer generally to media such as a removable storage drive 514, a hard disk installed in hard disk drive 512, and signals 528. These computer program products provide software to the computer system 500. Aspects presented herein may include such computer program products.

Computer programs (also referred to as computer control logic) may be stored in main memory 508 and/or secondary memory 510. Computer programs may also be received via communications interface 524. Such computer programs, when executed, may enable the computer system 500 to perform the features presented herein, as discussed herein. In particular, the computer programs, when executed, may enable the processor 505 to perform the features described supra with respect to FIG. 1, FIG. 2, FIG. 3, and FIG. 4, as well as to perform the features described infra with respect to FIGS. 6A and 6B. Accordingly, such computer programs represent controllers of the computer system 500.

In aspects implemented using software, the software may be stored in a computer program product and loaded into computer system 500 using removable storage drive 514, hard drive 512, or communications interface 520. The control logic (software), when executed by the processor 505, may cause the processor 505 to perform the functions as described supra with respect to FIG. 1, FIG. 2, FIG. 3, and FIG. 5, and as described infra with respect to FIGS. 6A and 6B. In another example, aspects may be implemented primarily in hardware using, for example, hardware components, such as application specific integrated circuits (ASICs). Implementation of the hardware state machine so as to perform the functions described herein will be apparent to persons skilled in the relevant art(s).

Figure 6A:
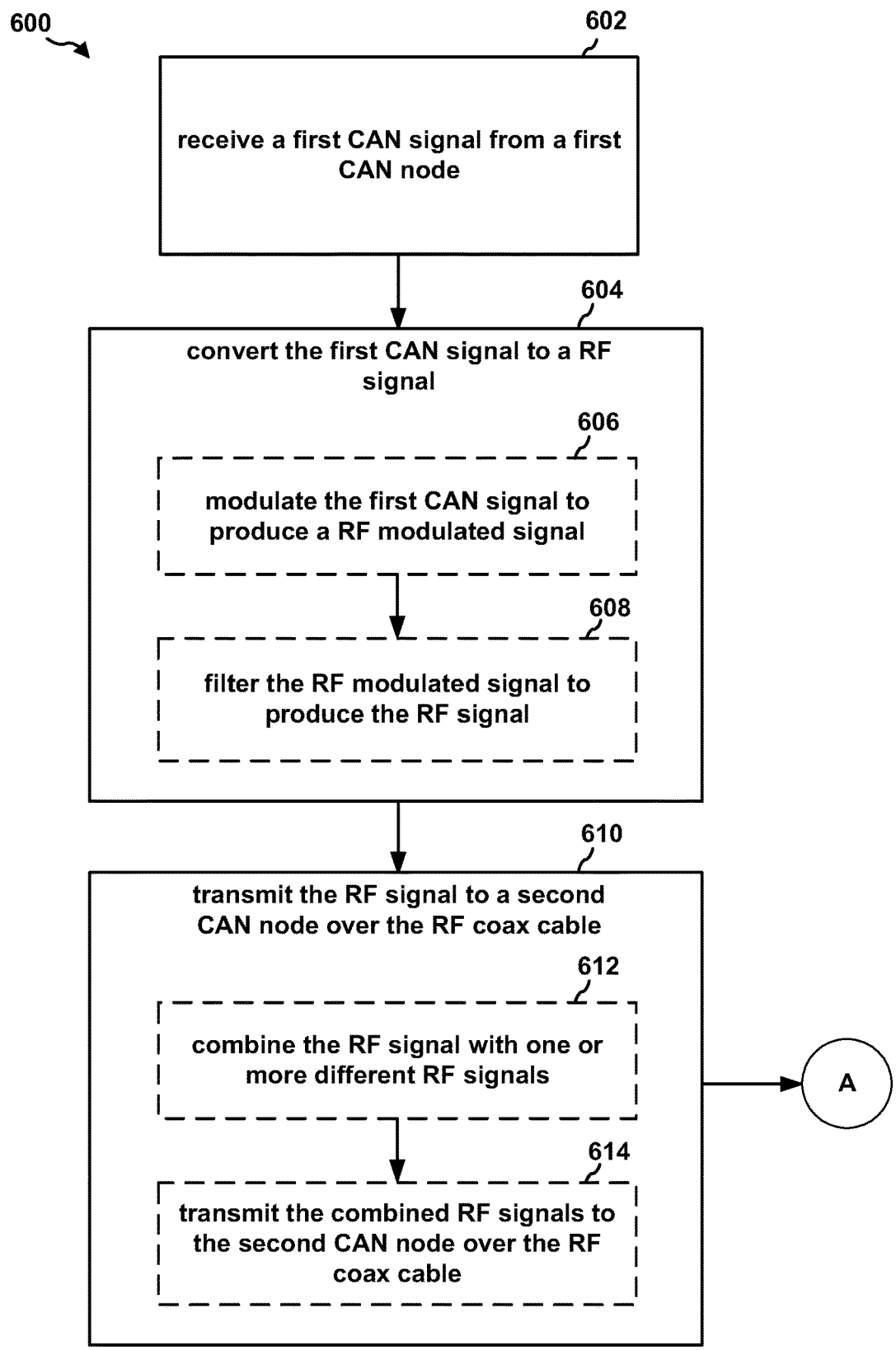
FIGS. 6A and 6B are a flowchart of a method for implementing CAN communications between a plurality of CAN nodes using a RF coax cable in accordance with certain aspects of the present disclosure.
Figure 6B:
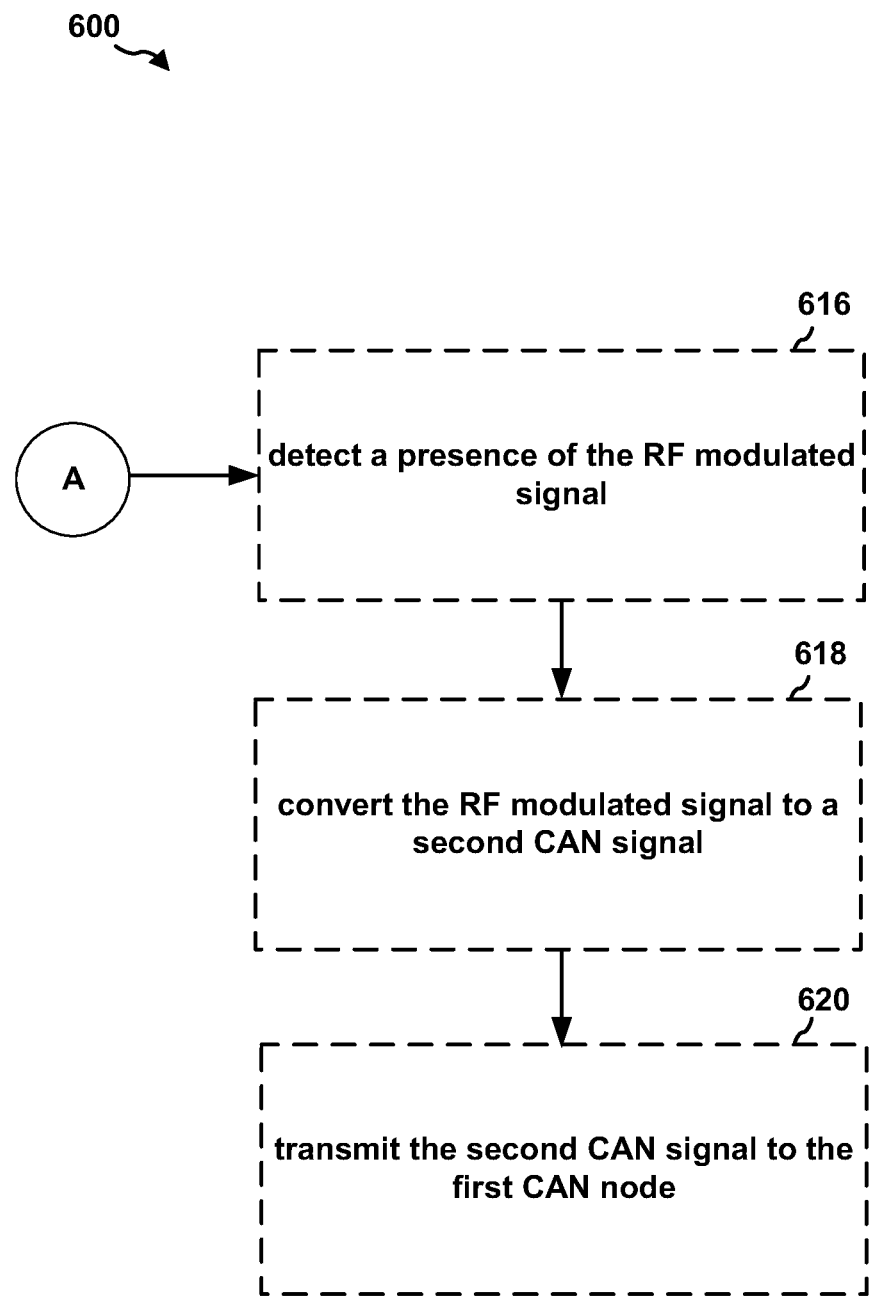

FIGS. 6A and 6B are a flowchart 600 of a method for implementing CAN communications between a plurality of CAN nodes using a RF coax cable in accordance with certain aspects of the present disclosure. The method may be performed by a CAN/RF converter (e.g., the CAN/RF conversion unit 230, 322, CAN/RF converter 400, the computer system 500). In FIGS. 6A and 6B, operations indicated with dashed lines may represent optional operations for various aspects of the disclosure.

As seen in FIG. 6A, at 602, the CAN/RF converter may receive a first CAN signal from a first CAN node. In an aspect, the first CAN node may be or include a modem or an antenna interface unit of an antenna, for example. In another aspect, the modem may be or include a satellite modem. In a further aspect, the antenna may be or include a phased array antenna configured to track a satellite. For example, referring to FIGS. 1, 2, and 4, the CAN/RF converter 400 may receive a CAN-bus signal 430 from the modem 220 (FIG. 2). In one aspect, the modem 220 may be, for example, a satellite modem, which may process digital data and facilitate communications with a satellite 102 (FIG. 1). In another aspect, antenna 110 (FIG. 1) may be a phased array antenna, including a plurality of antenna elements.

At 604, the CAN/RF converter may convert the first CAN signal to a RF signal. For example, referring to FIG. 4, the AM modulator 410 may comprise suitable circuitry (e.g., one or more transistors) for converting a CAN-bus signal 430 to an RF signal 434.

At 606, the CAN/RF converter may convert the first CAN signal to the RF signal by modulating the first CAN signal to produce a RF modulated signal. For example, referring to FIG. 4, the AM modulator 410 may modulate a CAN-bus signal 430 received from modem 220 (FIG. 2) to a radio frequency such as, but not limited to, 316 megahertz (MHz) to generate an RF signal 434.

At 608, the CAN/RF converter may convert the first CAN signal to the RF signal by filtering the RF modulated signal to produce the RF signal. For example, referring to FIG. 4, the bandpass filter 440 may comprise suitable circuitry for filtering an RF signal 434. For example, in an aspect, the bandpass filter 440 may be or include a surface acoustic wave (SAW) filter with a center frequency such as, but not limited to, 316 MHz. In an aspect, the bandpass filter 440 may filter an RF modulated signal 434 received from AM modulator 410 to generate a filtered RF signal 436.

At 610, the CAN/RF converter may transmit the RF signal to a second CAN node over the RF coax cable. For example, referring to FIG. 4, the filtered RF signal 436 may then be transmitted over a single RF coax cable 108 (FIG. 2).

At 612, the CAN/RF converter may transmit the RF signal to a second CAN node over the RF coax cable by combining the RF signal with one or more different RF signals. For example, referring to FIGS. 2 and 4, the filtered RF signal 436 may be combined with other RF signals (e.g., data signal(s) 250, timing reference signal(s) 252, and/or power signal(s) 254) to generate a single RF signal.

At 614, the CAN/RF converter may transmit the RF signal to a second CAN node over the RF coax cable by transmitting the combined RF signals to the second CAN node over the RF coax cable. For example, referring to FIGS. 2 and 4, the filtered RF signal 436 may be transmitted to a discrete diplexer 240, where the filtered RF signal 436 may be combined with other RF signals (e.g., data signal(s) 250, timing reference signal(s) 252, and/or power signal(s) 254) to generate a single RF signal. The discrete diplexer 240 may then transmit the single RF signal over the single RF coax cable 108 (FIG. 1) to an antenna interface unit 104 (FIG. 1).

As seen in FIG. 6B, at 616, the CAN/RF converter may detect a presence of the RF modulated signal. For example, referring to FIG. 4, the AM detector 420 may detect the presence of an RF modulated signal 434 that includes a CAN-bus signal with a modified or a non-modified identifier field.

At 618, the CAN/RF converter may convert the RF modulated signal to a second CAN signal. In an aspect, the second CAN signal may be a CAN feedback signal. For example, referring to FIG. 4, the AM detector 420 may then convert the RF modulated signal 434 to a CAN-bus feedback signal 432.

At 620, the CAN/RF converter may transmit the second CAN signal to the first CAN node. For example, referring to FIG. 4, the AM detector 420 may transmit the CAN-bus feedback signal 432 to modem 220 (FIG. 2).

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Thus, the claims are not intended to be limited to the aspects shown herein, but are to be accorded the full scope consistent with the language of the claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of the processes/flowcharts disclosed is an illustration of example approaches. Based upon design preferences, it is understood that the specific order or hierarchy in the processes/flowcharts may be rearranged. Further, some features/steps may be combined or omitted. The accompanying method claims present elements of the various features/steps in a sample order, and are not meant to be limited to the specific order or hierarchy presented.

Further, the word "example" is used herein to mean "serving as an example, instance, or illustration." Any aspect described herein as "example" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. Nothing disclosed herein is intended to be dedicated to the public regardless of whether such disclosure is explicitly recited in the claims.

What is claimed is:

1. An electronic circuit, comprising:
   an input port configured to receive a first controller area network (CAN) signal;
   a conversion circuit configured to convert the first CAN signal to a radio frequency (RF)-over-coax signal; and
   a first output port coupled with a coaxial cable and configured to transmit the RF-over-coax signal over the coaxial cable.

2. The electronic circuit of claim 1, wherein the conversion circuit comprises:
   an amplitude modulation (AM) circuit configured to modulate the first CAN signal to produce a RF modulated signal; and
   a bandpass filter circuit configured to filter the RF modulated signal to produce the RF-over-coax signal.

3. The electronic circuit of claim 2, wherein the conversion circuit further comprises:
   a detection circuit, wherein the detection circuit is configured to:
   detect a presence of the RF modulated signal, and
   convert the RF modulated signal to a second CAN signal.

4. The electronic circuit of claim 3, further comprising:
   a second output port configured to transmit the second CAN signal, wherein the second CAN signal is a CAN feedback signal.

5. The electronic circuit of claim 1, wherein:
   the input port is coupled with a modem or an antenna interface unit of an antenna.

6. The electronic circuit of claim 1, wherein:
   the first output port is coupled with an input port of a diplexing circuit via the coaxial cable.

7. The electronic circuit of claim 5, wherein:
   the modem is a satellite modem, and
   the antenna is a phased array antenna configured to track a satellite.

8. A method for implementing controller area network (CAN) communications between a plurality of CAN nodes using a radio frequency (RF) coax cable, the method comprising:
   receiving a first CAN signal from a first CAN node;
   converting the first CAN signal to a RF-over-coax signal; and
   transmitting the RF-over-coax signal to a second CAN node over the RF coax cable.

9. The method of claim 8, wherein the converting the first CAN signal to the RF-over-coax signal further comprises:
   modulating the first CAN signal to produce a RF modulated signal; and
   filtering the RF modulated signal to produce the RF-over-coax signal.

10. The method of claim 9, further comprising:
    detecting a presence of the RF modulated signal; and
    converting the RF modulated signal to a second CAN signal.

11. The method of claim 10, further comprising:
    transmitting the second CAN signal to the first CAN node, wherein the second CAN signal is a CAN feedback signal.

12. The method of claim 8, wherein the first CAN node is a modem or an antenna interface unit of an antenna.

13. The method of claim 8, wherein transmitting the RF-over-coax signal to a second CAN node over the RF coax cable further comprises:
    combining the RF-over-coax signal with one or more different RF-over-coax signals;
    transmitting the combined RF-over-coax signals to the second CAN node over the RF coax cable.

14. The method of claim 12, wherein:
    the modem is a satellite modem, and
    the antenna is a phased array antenna configured to track a satellite.

15. A computer-readable medium storing computer executable code for controller area network (CAN) communications, comprising code to:
    receive a first CAN signal from a first CAN node;
    convert the first CAN signal to a radio frequency (RF)-over-coax signal; and
    transmit the RF-over-coax signal to a second CAN node over an RF coax cable.

16. The computer-readable medium of claim 15, wherein the code is configured to convert the first CAN signal to the RF-over-coax signal by:
    modulating the first CAN signal to produce a RF modulated signal; and
    filtering the RF modulated signal to produce the RF-over-coax signal.

17. The computer-readable medium of claim 16, further comprising code to:
    detect a presence of the RF modulated signal; and
    convert the RF modulated signal to a second CAN signal.

18. The computer-readable medium of claim 17, further comprising code to:
    transmit the second CAN signal to the first CAN node, wherein the second CAN signal is a CAN feedback signal.

19. The computer-readable medium of claim 15, wherein the first CAN node is a modem or an antenna interface unit of an antenna.

20. The computer-readable medium of claim 15, wherein the code is configured to transmit the RF-over-coax signal to a second CAN node over the RF coax cable by:
    combining the RF-over-coax signal with one or more different RF-over-coax signals; and
    transmitting the combined RF-over-coax signals to the second CAN node over the RF coax cable.

\* \* \* \* \*